UNITED STATES PATENT OFFICE.

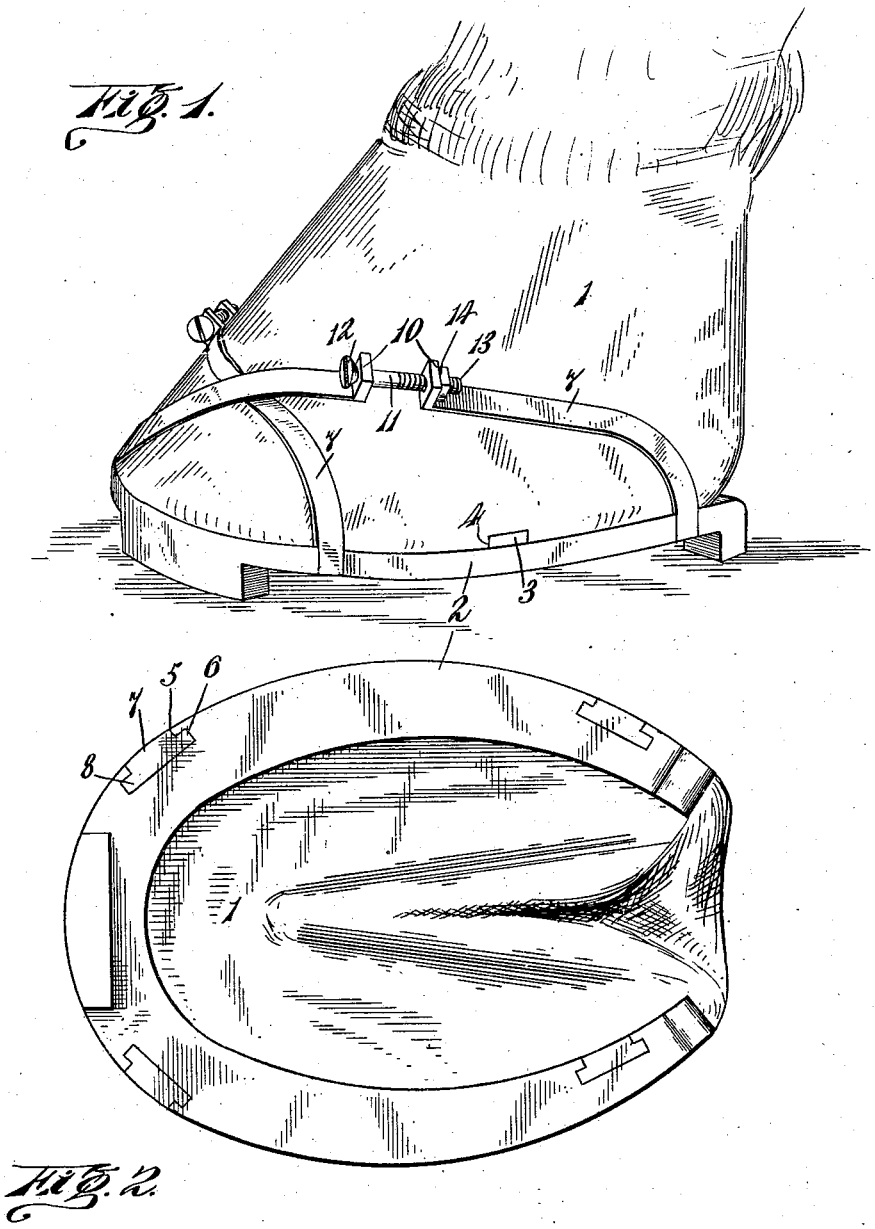

ALEXANDER HOUSTON McLACHLAN, OF MAGNETAWAN, ONTARIO, CANADA.

HORSESHOE ATTACHMENT.

No. 860,101. Specification of Letters Patent. Patented July 16, 1907.

Application filed April 25, 1906. Serial No. 313,576.

*To all whom it may concern:*

Be it known that I, ALEXANDER HOUSTON MCLACH-LAN, a subject of the King of Great Britain, residing at Magnetawan, county of Parry Sound, in the Province of Ontario, Canada, have invented certain new and useful Improvements in Horseshoe Attachments; and I do hereby declare that the following is a full, clear, and exact description of the invention, such as will enable others skilled in the art to which it appertains to make and use the same.

My invention relates to horse shoes; the object of my invention is to provide means for attaching a horse shoe to the hoof of a horse without the use of nails; and, my invention consists of the construction, combination and arrangement of parts, as herein illustrated, described and claimed.

In the accompanying drawings, forming part of this application, I have illustrated one form of embodiment of my invention, in which drawings similar reference characters designate corresponding parts, and in which:

Figure 1 is a perspective showing the application of my invention; and, Fig. 2 is a bottom plan view.

Referring to the drawings, 1 designates a hoof of a horse, to which is attached the shoe 2 forming part of my invention. The upper face of the shoe 2 is provided with lugs 3 on opposite sides thereof adapted to fit into recesses 4 formed in the bottom of the hoof.

The vertical faces of the shoe 2 are provided with a plurality of dove-tailed slots 5, adjacent which, in the bottom of the shoe, is provided a plurality of recesses 6. A plurality of pliable metal straps 7 are provided with lugs 8 adapted to engage in the recesses 6, as most clearly shown in Fig. 2. The straps 7 are provided with upturned ends 10, through which are disposed bolts 11 provided with slotted heads 12 and oppositely screw-threaded ends 13 adapted to receive nuts 14, by means of which the upper ends of the straps are adjustably secured together. The two forward straps 7 are disposed crossing each other adjacent the toe of the hoof. By making the straps 7 of pliable metal and having the fastening means of the construction described, the straps are adapted for use in connection with any sized shoe or hoof.

Having thus fully described my invention, what I claim as new, and desire to secure by Letters Patent, is:—

1. A device for attaching horse shoes, comprising a horse shoe, dove-tailed recesses therein, flexible metallic straps provided with lugs correspondingly shaped and adapted to fit into and coöperate with said dove-tailed recesses, lugs integrally formed upon said shoe and adapted to fit into corresponding recesses or notches in the hoof of the horse, and turn buckles on said straps whereby said straps may be tightened and the shoe drawn into position on the hoof and so held.

2. A device for attaching horse shoes, comprising a shoe, dove-tailed recesses in said shoe, pliable metallic straps, lugs on the opposite ends of said straps adapted to fit into and engage said recesses, the lugs of one strap engaging diagonally opposite recesses in the shoe, and the lugs of the other strap engaging diagonally opposite recesses in the shoe, whereby said straps are crossed and all tendency toward twisting the shoe upon the foot of the horse is avoided, lugs integrally formed with the shoe and adapted to fit into and coöperatively engage corresponding notches in the hoof of a horse, and turn buckles on the aforesaid straps, whereby said straps may be tightened to thereby draw the shoe into position and securely hold the same.

In witness whereof I have hereunto set my hand in the presence of two witnesses.

ALEXANDER HOUSTON McLACHLAN.

Witnesses:
J. LAMB,
W. H. SMITH.